(12) United States Patent
Pendergrass

(10) Patent No.: US 9,638,593 B2
(45) Date of Patent: May 2, 2017

(54) SINKHOLE DETECTION SYSTEMS AND METHODS

(71) Applicant: GEOENGINEERS, INC., Seattle, WA (US)

(72) Inventor: Gary J. Pendergrass, Springfield, MO (US)

(73) Assignee: GEOENGINEERS, INC., Seattle, WA (US)

( * ) Notice: Subject to any disclaimer, the term of this patent is extended or adjusted under 35 U.S.C. 154(b) by 68 days.

(21) Appl. No.: 14/717,357

(22) Filed: May 20, 2015

(65) Prior Publication Data

US 2016/0341614 A1    Nov. 24, 2016

(51) Int. Cl.
*G01L 5/04*        (2006.01)
(52) U.S. Cl.
CPC .................... *G01L 5/045* (2013.01)
(58) Field of Classification Search
CPC ............ G01N 3/00; B60R 21/015; G01L 5/04
USPC .................................................... 73/862.391
See application file for complete search history.

(56) References Cited

U.S. PATENT DOCUMENTS

| 4,070,906 | A |   | 1/1978  | Rupert et al. |
| 5,038,622 | A |   | 8/1991  | Tijmann |
| 5,113,707 | A |   | 5/1992  | Herget |
| 5,337,613 | A |   | 8/1994  | Kovari |
| 5,567,932 | A | * | 10/1996 | Staller ............... G01V 8/10 250/227.14 |
| 6,972,687 | B1 |  | 12/2005 | Marshall et al. |
| 7,066,023 | B2 | * | 6/2006 | Herzen ............... G01N 33/18 73/304 R |
| 7,975,556 | B2 |  | 7/2011  | Hatami et al. |
| 8,004,405 | B1 |  | 8/2011  | Gal |
| 8,752,438 | B2 |  | 6/2014  | Hatami et al. |
| 2007/0251326 | A1 | | 11/2007 | Mathis |

* cited by examiner

*Primary Examiner* — Lisa Caputo
*Assistant Examiner* — Octavia Hollington
(74) *Attorney, Agent, or Firm* — Michael W. Goltry; Robert A. Parsons; Parsons & Goltry

(57) ABSTRACT

A sinkhole formation detection system includes tension members associated with sensors. The tension members are arranged in a horizontal grid in an overburden, and each of the tension members is under a longitudinal tension. The sensors are each for generating outputs in response to changes in the longitudinal tension of one of the tension members in response to a vertical displacement of the overburden.

19 Claims, 6 Drawing Sheets

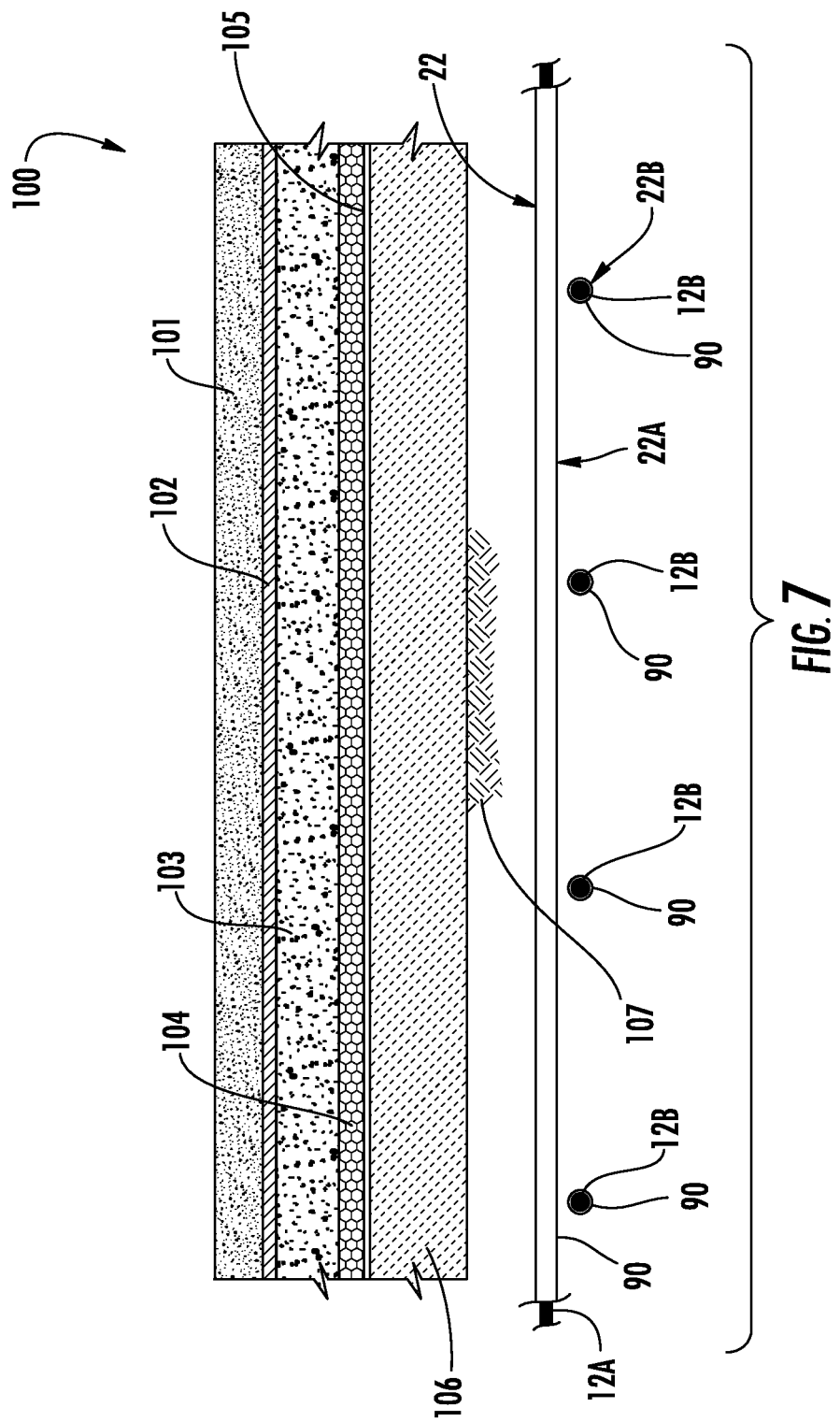

SINKHOLE DETECTION SYSTEMS AND METHODS

FIELD OF THE INVENTION

The present invention relates to sinkholes and, more particularly, to apparatus and methods for detecting pending sinkhole collapse in areas prone to collapse sinkholes, whether naturally occurring or artificially occurring.

BACKGROUND OF THE INVENTION

A sinkhole is a depression or hole in the ground produced by collapse of the surface layer. Sinkholes can vary from a few feet to hundreds of acres and from less than 1 to hundreds of feet deep. Some sinkholes are shaped like shallow bowls or saucers, others have vertical walls, and some hold water and form natural ponds. Sinkholes can form slowly so that little change is noticeable, or suddenly when a collapse occurs. A sudden collapse can have a dramatic effect if it occurs in an urban setting, landfill areas, and storage tank areas.

Sinkholes are common where the rock below the ground surface can naturally be dissolved by groundwater. Soluble rocks include limestone, dolomite, gypsum, and salt beds, among others. As the rock dissolves, voids develop underground. Sinkhole formation is often dramatic because the land surface usually remains intact until the underground voids become so large that there is insufficient support for the overlying land, or overburden, the material overlying the rock deposit, resulting in a sudden collapse of the land surface. Types of sinkholes include dissolution sinkholes, subsidence sinkholes, and collapse sinkholes.

In a dissolution sinkhole, rainfall and surface water percolate through joints or cracks in limestone. Dissolved rock is carried away from the surface and a surface depression gradually forms. Debris carried into the developing sinkhole can plug the outflow, ponding water and creating wetlands. Dissolution sinkholes are relatively stable and easily avoided.

Subsidence sinkholes tend to develop gradually where the covering sediments are permeable and contain sand. Subsidence sinkholes are relatively uncommon, and may go undetected for long periods in areas where the cover material is thicker or the sediments contain more clay. In a subsidence sinkhole, ground sediments spall into fractures or openings in underlying soluble rock. In a process named "piping," a column of overlying sediment, the overburden, mostly of sand, settles into the vacated spaces. This dissolution and infilling persists, forming a depression in the overburden surface. The downward erosion eventually forms subsurface depressions, that can range from one-inch to many feet in depth and diameter.

Collapse sinkholes often develop abruptly, often over a period of hours, and can cause catastrophic damage. In collapse sinkholes, ground sediments spall into a fracture or cavity in the underlying rock or substrate. As this process continues, the cohesive covering sediments of the overburden can form a structural arch. The cavity migrates upward by progressive roof collapse. The cavity eventually breaches the ground surface, creating a sudden and dramatic sinkhole.

Land-use practice can also form sinkholes, especially from groundwater pumping and from construction and development practices. Sinkholes can also form when natural water-drainage patterns are changed and new water-diversion systems are developed, and when the land surface is changed, such as when industrial and runoff storage ponds are created. The substantial weight of the new material can trigger an underground collapse of supporting material, thus causing a sinkhole.

Groundwater fluid pressure balances overburden sediments that cover buried cavities in aquifer systems. The groundwater works as a supporting structure stabilizing the overburden. Groundwater pumping for urban water supply and for irrigation purposes can reduce the groundwater levels lowering the groundwater fluid pressure, which can lead to underground structural failure and the formation of a resulting sinkhole.

Collapse sinkholes, including those produced artificially by land-use practices and groundwater harvesting, can produce substantial property damage and loss of life, and groundwater contamination, such as when landfill contents or storage tank contents are lost to the groundwater. However, if movement of overlying overburden associated with the impending formation of a sinkhole is detected soon enough, action could be taken to repair or fill in the fracture under the overburden to arrest sinkhole formation. Accordingly, there is need in the art for an "early warning system" that can alert an authority or a facility operator to a pending sinkhole collapse, and which can pinpoint the location of the pending sinkhole collapse, allowing workers to initiate procedures for stabilization of sinkhole collapse.

SUMMARY OF THE INVENTION

According to the principle of the invention, a sinkhole formation detection system includes tension members associated with sensors. The tension members are arranged in a horizontal grid in an overburden. Each of the tension members is under a longitudinal tension. The sensors are each for generating outputs in response to changes in the longitudinal tension of one of the tension members in response to a vertical displacement of the overburden. The grid is an x-y grid. Each of the tension members is longitudinally tensioned between an anchor and one of the sensors. Each of the tension members is housed in a flexible conduit. Each of the sensors is a strain gauge. A data logger is operatively coupled to receive the outputs from the sensors. Each of the tension members is a cable.

According to the principle of the invention, a sinkhole formation detection system includes a horizontal first array of spaced-apart and parallel first tension members in an overburden, and a horizontal second array of spaced-apart and parallel second tension members in the overburden. The first array is parallel and superimposed relative to the second array, and the first tension members are transverse relative to the second tension members. The first tension members and the second tension members are associated with sensors. Each of the first tension members and the second tension members is under a longitudinal tension. The sensors are each for generating outputs in response to changes in the longitudinal tension of one of the first tension members and the second tension members in response to a vertical displacement of the overburden. The first tension members intersect the second tension members at intersections along a vertical plane, each intersection being a vertical point common in one of the first tension members and one of the second tension members. Each of the first tension members and the second tension members is longitudinally tensioned between an anchor and one of the sensors. Each of the first tension members and the second tension members is housed in a flexible conduit. Each of the sensors is a strain gauge. A data logger is operatively coupled to receive the outputs from the sensors. Each of the tension members is a cable.

According to the principle of the invention, a sinkhole formation detection system includes a horizontal first array of spaced-apart and parallel first tension members in an overburden across a ground area, and a horizontal second array of spaced-apart and parallel second tension members in the overburden across the ground area. The ground area has a first side, a second side, a first end, and a second end. The first array is parallel and superimposed relative to the second array, and the first tension members are transverse relative to the second tension members. Each of the first tension members are under a first longitudinal tension. Each of the second tension members are under a second longitudinal tension. The first tension members are longitudinally tensioned from the first end of the ground area to the second end of the ground area between respective first anchors proximate to the first end of the ground area and respective first sensors proximate to the second end of the ground area. The second tension members are longitudinally tensioned from the first side of the ground area to the second side of the ground area between respective second anchors proximate to the first side of the ground area and respective second sensors proximate to the second side of the ground area. The first sensors are each for generating first outputs in response to changes in the longitudinal tension of one of the first tension members in response to a vertical displacement of the overburden. The second sensors are each for generating second outputs in response to changes in the longitudinal tension of one of the second tension members in response to a vertical displacement of the overburden. The first tension members intersect the second tension members at intersections along a vertical plane, each intersection being a vertical point common in one of the first tension members and one of the second tension members. Each of the first tension members and the second tension members is housed in a flexible conduit. Each of the first sensors and the second sensors is a strain gauge. A data logger is operatively coupled to receive the first outputs from the first sensors and the second outputs from the second signals. Each of the tension members is a cable.

Consistent with the foregoing summary of illustrative embodiments, and the ensuing detailed description, which are to be taken together, the invention also contemplates associated system and method embodiments.

BRIEF DESCRIPTION OF THE DRAWINGS

Referring to the drawings:

FIG. 7 is a fragmented vertical section view of a landfill liner design incorporating a sinkhole formation detection system constructed and arranged in accordance with the principle of the invention.

DETAILED DESCRIPTION

Throughout this specification the terms "horizontal," "vertical," "perpendicular", and "parallel" are used. These terms are given their customary and ordinary meaning as would be understood by persons having ordinary skill in the art. The term "horizontal" means at right angles to the vertical, or parallel to level ground. The meaning of the term "vertical" is upright, or being in a position or direction perpendicular to a plane. The meaning of the term "perpendicular" is being at right angles to a given line or plane. The term "parallel" means extending in the same direction. As understood by those skilled in the art, these terms are intended to encompass normal variations inherent in practical applications of the invention disclosed below consistent with the teachings presented herein.

Figure 1:
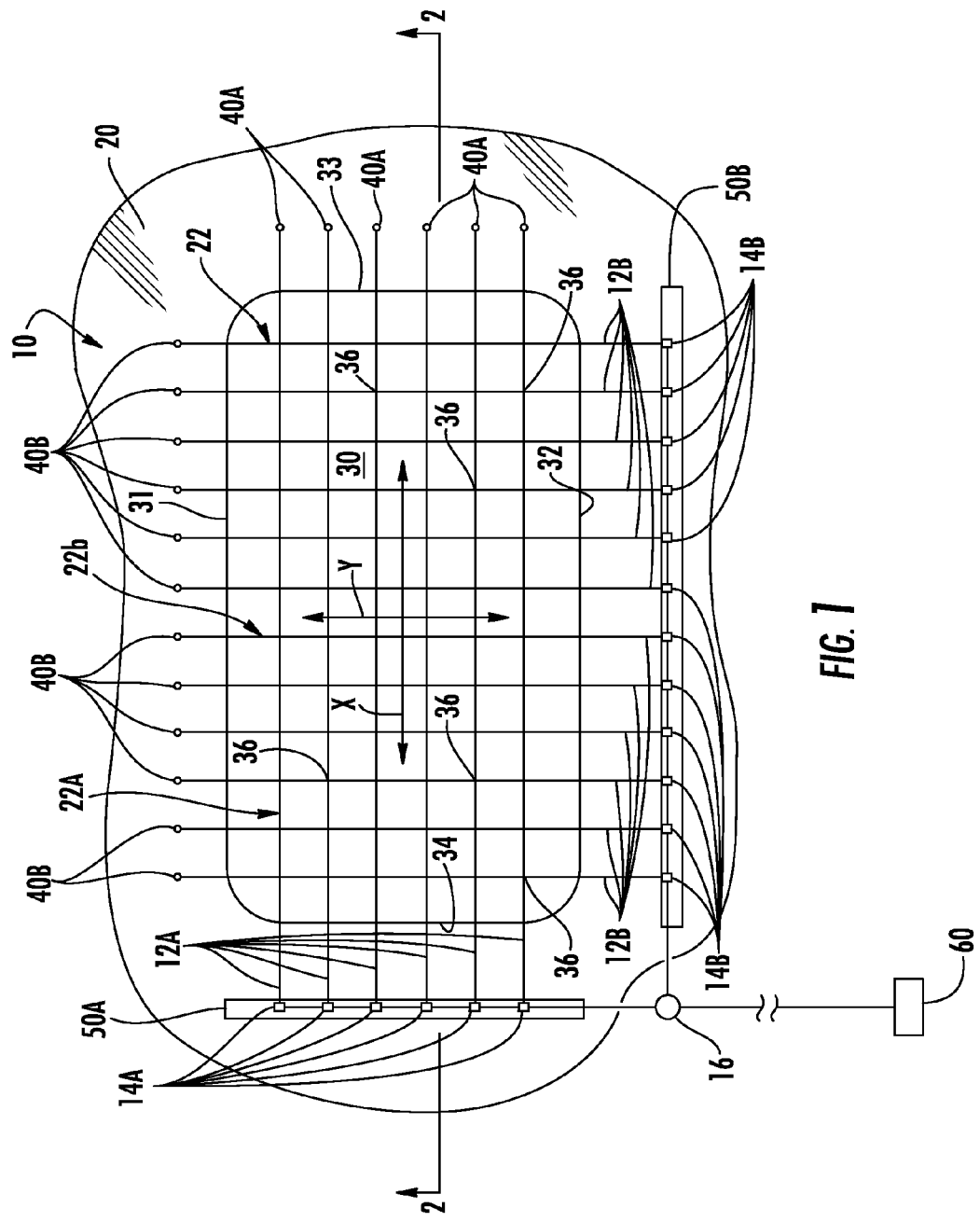
FIG. 1 is a top plan view of a sinkhole formation detection system constructed and arranged in accordance with the principle of the invention, the sinkhole formation detection system includes tension members associated with sensors, and a data logger operatively coupled to receive outputs from the sensors in response to changes in tension in the tension members resulting from overburden displacement over a pending sinkhole collapse.

Turning now to the drawings, in which like reference characters indicate corresponding elements throughout the several views, attention is first directed to FIG. 1, in which there is seen a sinkhole formation detection system 10 including tension members 12 associated with sensors 14 each for generating outputs, i.e. output signals, in response to sensed changes in a corresponding tension member 12, and a data logger 16 operatively coupled to receive outputs, i.e. output signals, from sensors 14 in response to changes in tension in tension members 12 resulting from overburden displacement over tension members 12 over a pending sinkhole collapse. Tension members 12 are installed in overburden 20, and are arranged in a horizontal grid 22. Overburden 20, naturally-occurring or artificially created by man, is the ground material overlying a rock deposit or other like or similar substrate prone to sinkhole collapse. Overburden 20 is typically sand, soil, or other like or similar earthen or fill material or combination of earthen or fill material not being a rock deposit or other like or similar substrate. Each tension member 12 is tensioned longitudinally, being under a longitudinal tension, through overburden 20. Each sensor 14 is associated with one tension member 12. Each tension member 12 is longitudinally tensioned between an anchor 40 and one sensor 14. Sensors 14 are each for generating outputs in response to changes in the longitudinal tension of one of tension members 12, caused in response to a downward displacement of overburden 22 in a vertical direction relative to the horizontal direction of horizontal grid 22 over the tension members 12 resulting from a pending collapse of a sinkhole under tension members 12. In this example, a data logger 16 is operatively coupled to receive outputs from sensors 14, and is operatively coupled to issue corresponding outputs designed to alert facility operators, officials, or workers to the pending sinkhole collapse so that suitable area evacuations and closures can be made and as so that the pending collapse can be repaired to prevent sinkhole collapse.

Tension members 12 are elongate, flexible cables in this example, being ropes or cords made of strands of metal wire each having a ¼ inch to 1 inch diameter in an example of an illustrative embodiment with the understanding the other sizes can be used. Tension members 12 are arranged in two arrays, including a first array, denoted generally at 22A, and a second array, denoted generally at 22B. In this example, there are six tension members 12A in first array 22A, and twelve tension members 12B in second array 22B. The number of tension members in first array 22A and in second array 22A can vary depending on the application of system 10 and the size and shape of the ground area to be monitored for pending sinkhole collapse in the use of system 10. Tension members 12A of first array 22A are spaced-apart, equidistantly in this example, are parallel relative to one another, and are equal in size and in length. Tension members 12A concurrently extend along a first or "X" direction indicated by double arrowed line X in FIG. 1. Tension members 12B of second array 22B are spaced-apart, equidistantly in this example, are parallel relative to one another, and are equal in size and in length. Tension members each 12B concurrently extend along a second or "Y" direction indicated by double arrowed line Y in FIG. 1. The second or Y direction of tension members 12B is transverse, perpendicular in this example, relative to the first or X direction of tension members 12A. Accordingly, tension members 12A of first array 22A are transverse, perpendicular in this example, relative to tension members 12B of second array 22B.

Figure 2:
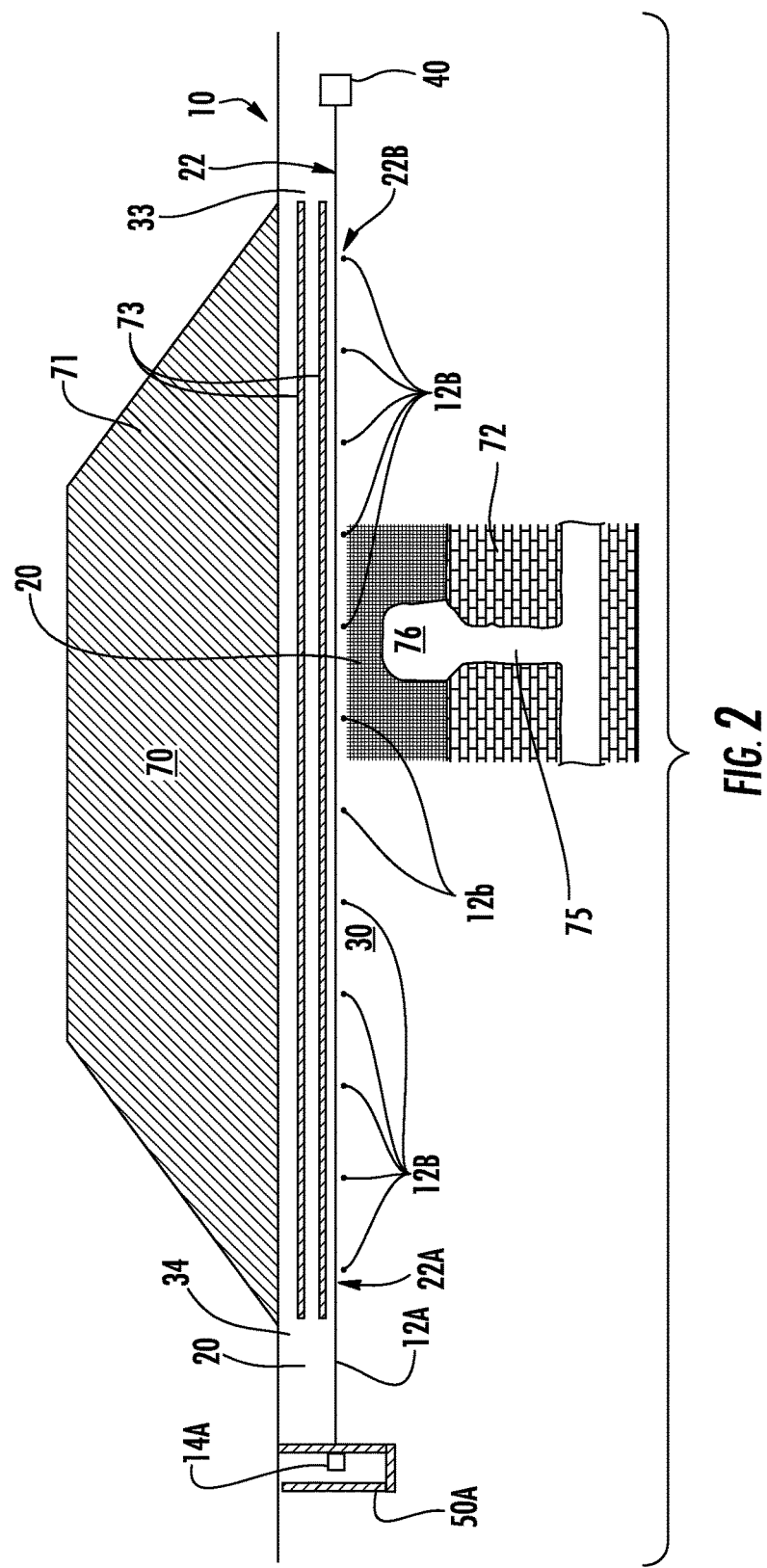
FIG. 2 is taken along line 2-2 of FIG. 1, illustrating the sinkhole formation detection system installed in a ground area of a landfill.

First array 22A of tension members 12A and second array 22B of tension members in overburden 20 concurrently extend across a ground area 30 of overburden 20. In this example, ground area 30, the area of ground to be monitored for underlying sinkhole formation by system 10, has a first side 31, a second side 32, a first end 33, and a second end 34. In FIG. 2, first array 22A of tension members 12A is parallel and superimposed relative to second array 22B of tension members 12B, tension members 12A extend in the X direction and are transverse, perpendicular in this example, relative to tension members 12B. Tension members 12A of first array 22A are not connected to each other and work independently from one another without being influenced by or from one another. Tension members 12B of second array 22B are not connected to each other and work independently from one another without being influenced by or from one another. Tension members 12A of first array 22A are not connected to tension members 12B of second array 22B. Accordingly, tension members 12A of first array 22A work independently from, and are not influenced by or from, tension members 12B of second array 22B, and vice versa. This arrangement of tension members 12A of first array 22A and tension members 12B of second array 22B characterizes grid 22 of tension members 12 across ground area 30, the grid 22 being an x-y grid of "X" tension members 12A of first array 22A and "Y" tension members 12B of second array 22B. Tension members 12A of first array 22A intersect second tension members 12B at intersections 36 along a vertical plane. Each intersection 36 in the vertical plane is a vertical point common in one of tension members 12A and one of tension members 12B.

In this example, ground area 30 is approximately the size of an American football field, being approximately 54 yards in width from first side 31 to second side 32, and approximately 120 yards in length from first end 33 to second end 34. With this size of ground area 30 in this specific example, tension members 12A of first array 22A are equally spaced approximately eight yards apart from one another, and tension members 12B of second array 22B are equally spaced apart approximately eight yards from one another. Other spacings, whether lesser or greater, can be used between tension members 12A and between tension members 12B in the given installation, depending on specific needs and the relative size of the ground area to be monitored. The size of ground area 30, the number of tension members 12, and the spacing between tension members 12 is presented here by way of example, with the understanding that the size of the ground area can be greater or smaller, the number of tension members 12 can be greater or smaller, and the spacing between tension members 12 can be greater or smaller, consistent with the teachings of the present invention.

Each tension member 12A of first array 22A is under a first longitudinal tension in the X direction across ground area 30 from first end 33 to second end 34, and each tension member 12B of second array 22B is under a second longitudinal tension in the Y direction from first side 31 to second side 32. The first tension of each tension member 12A is the same as the first tension of each tension member 12B, in this example. Each tension member 12A is longitudinally tensioned in the X direction from first end 33 of ground area 30 to second end 34 of ground area 30 between one anchor 40A proximate to first end 34 of ground area 30 and one sensor 14A proximate to second end 34 of ground area 30. Each tension member 12B is longitudinally tensioned in the Y direction from first side 31 of ground area 30 to second side 32 of ground area 30 between one anchor 40B proximate to first side 31 of ground area 30 and one sensor 14B proximate to second side 32 of ground area 30. Sensors 14A are each for generating outputs in response to changes in the X direction longitudinal tension of its corresponding tension member 12A of first array 22A in response to a vertical displacement of the underlying overburden 20. Sensors 14B are each for generating outputs in response to changes in the Y direction longitudinal tension of its corresponding tension member 12B of second array 22B in response to a vertical displacement of the underlying overburden 20. Sensors 14 are connected electrically, and in signal communication, to data logger 16, preferably with conventional electrical wiring. In alternate embodiments, sensors 14 can be coupled in signal communication wirelessly to data logger 16, in which case sensors 14 need not be electrically connected to data logger 16. Power is supplied to sensors 14 and to data logger 16 via one or more dedicated power sources, battery power sources, generators, other one or more selected power sources.

Each anchor 40 is a stake, concrete block, or the like. Each anchor 40 is anchored in overburden 20, and is affixed to one end of a corresponding tension member 12. Each sensor 14 is a strain gauge, a known device used to measure strain on an object, in this case the longitudinal tension of a tension member in the form of a cable. Sensors 40 are anchored to fortifications 50 in overburden 20. Fortifications 50 are trough-like structures of concrete, steel-reinforced concrete, or metal, set below the surface of overburden 20. Sensors 40A are anchored to fortification 50A set below surface 20A of overburden 20 in FIG. 2. Fortification 50A is outboard of, and parallel to, second end 34 of ground area 30. Sensors 40B are anchored to fortification 50B, set below the surface of overburden 20 as with fortification 50A. Fortification 50B is outboard of, and parallel to, second side 32 of ground area 30. In this example, fortifications are open to surface 20A of overburden 20, for sensor installation, maintenance, and replacement purposes. Sensors 14 are resistant to environmental influences. However, fortifications 50 can be fitted with one or more closures for enclosing sensors 14 from environmental influences. Fortifications 50 can also be configured with one or more drains for draining water away from sensors 14 into the underlying overburden 20. To hasten drainage, fortifications 50 can be installed in a drainage field, whether naturally-occurring or artificial created by man in the installation and implementation of system 10.

Grid 22 of tension members 12, sensors 14, data logger 16, anchors 40, and fortifications 50 can be installed into an existing overburden, such as by digging through the overburden and then installing the components into the dug areas, or first installed on an overburden ground surface and then covered and enclosed in supplemental overburden material, such as in the construction of a landfill.

Data logger 16 continuously monitors sensors 14. Sensors 14 continuously sense the tension on tension members 12, and continuously send resulting outputs to data logger 16, which, in turn, continually issues corresponding outputs, i.e. output signals, in response. The outputs from sensors 14 constitute strain or tension data, received by data logger 16. Data logger 16 is a known electronic device that continuously receives and records the strain data from sensors 14. Preferably, data logger 16 is coupled in signal communication to a computer 60 in FIG. 1, which is programmed to present representations of the strain data, and to be used by a computer user to observe and analyze the strain data from data logger 16. Computer 60 can be wired in signal communication to data logger 16, or coupled in signal communication to data logger 16 wirelessly, such as over an Internet and/or an Intranet or other local area network. Computer 60 can be positioned locally relative to ground area 30 monitored by system 10, such as at a local monitoring station, or remotely relative to ground area 30 monitored by system 10, such as at a remote monitoring station.

FIG. 2 is a section view taken along line 2-2 of FIG. 1 illustrating system 10 installed in overburden 20 of ground area 30 of a landfill 70. Landfill 70 includes land 71 built up over ground area 30 of overburden 20 from deposits of material, such as solid refuse, in layers covered by soil. In this example, a pair of liners 73 extend horizontally in overburden 20 between land 71 and system 10 tension members 12. In the landfill design in FIG. 2, overburden 20, which is sand, soil, or other like or similar earthen or fill material or combination of earthen or fill material not being a rock deposit, is the material overlying rock deposit 72.

Figure 3:
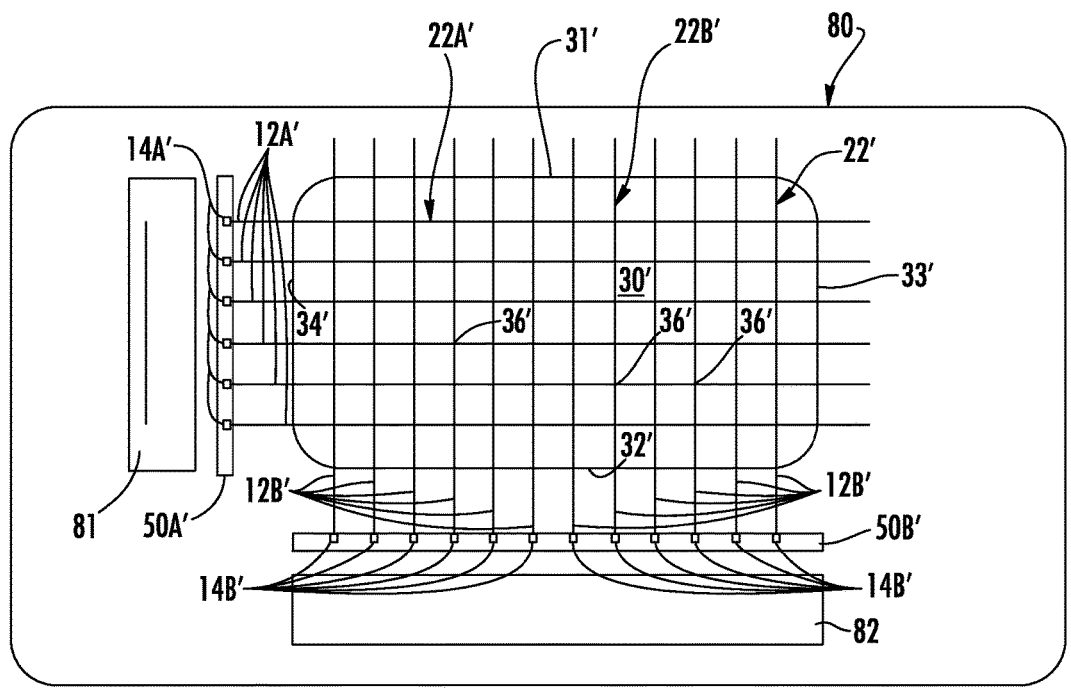
FIG. 3 is a plot of outputs of from the data logger of FIG. 1 corresponding to FIG. 2.

Data logger 16 constantly monitors the tension of tension members 12 by constantly receiving outputs from sensors 14, and relays outputs, i.e. output signals, to computer 60 in response. Computer 60 is programmed to generate plots of outputs from data logger 16, whether automatically or in response to inputs from the computer user. FIG. 3 is an example of a plot 80 of system 10 as generated by computer 60. Plot 80 represents the various components of system 10. For clarity, the various components of system 10 in plot 80 include a prime ("'") symbol. Plot 80 graphically represents grid 22' of tension members 12', including array 22A of tension members 12A and array 22B of tension members 12B, sensors 14', ground area 30', ends 31' and 32' of ground area 30, sides 33' and 34' of ground area 30', intersections 36', and fortifications 50. Plot 80 includes graphical display 81 associated with tension wires 12A and sensors 14A, and graphical display 82 associated with tension wires 12B and sensors 14B. Graphical displays 81 and 82 represent the condition or state of the tension in tension members 12. In the absence of changes in the tension of tension members 12 as sensed by sensors 14, graphical displays 81 and 82 remain flat, as in FIG. 3.

In the pending formation of a collapse sinkhole under grid 22 within ground area 30 monitored by system 10, ground sediments, such as from overburden 20, spall into a cavity or fracture 75 in the underlying rock deposit 72. As this process continues, a void 76 in overburden 20 forms a structural arch in overburden 20. During this process, sensors 14 continuously sense the tension on tension members 12, and continuously send resulting outputs to data logger 16, and data logger 16, in turn, continuously sends corresponding outputs to computer 60. In other words, data logger 16 continuously monitors the tension of tension members 12 via sensors 14 and relays corresponding outputs to computer 60. Again, in the absence of changes in the tension of tension members 12 as sensed by sensors 14, graphical displays 81 and 82 remain flat, as in FIG. 3 corresponding to the view of FIG. 2, corresponding to the outputs issued from data logger 16.

Figure 4:
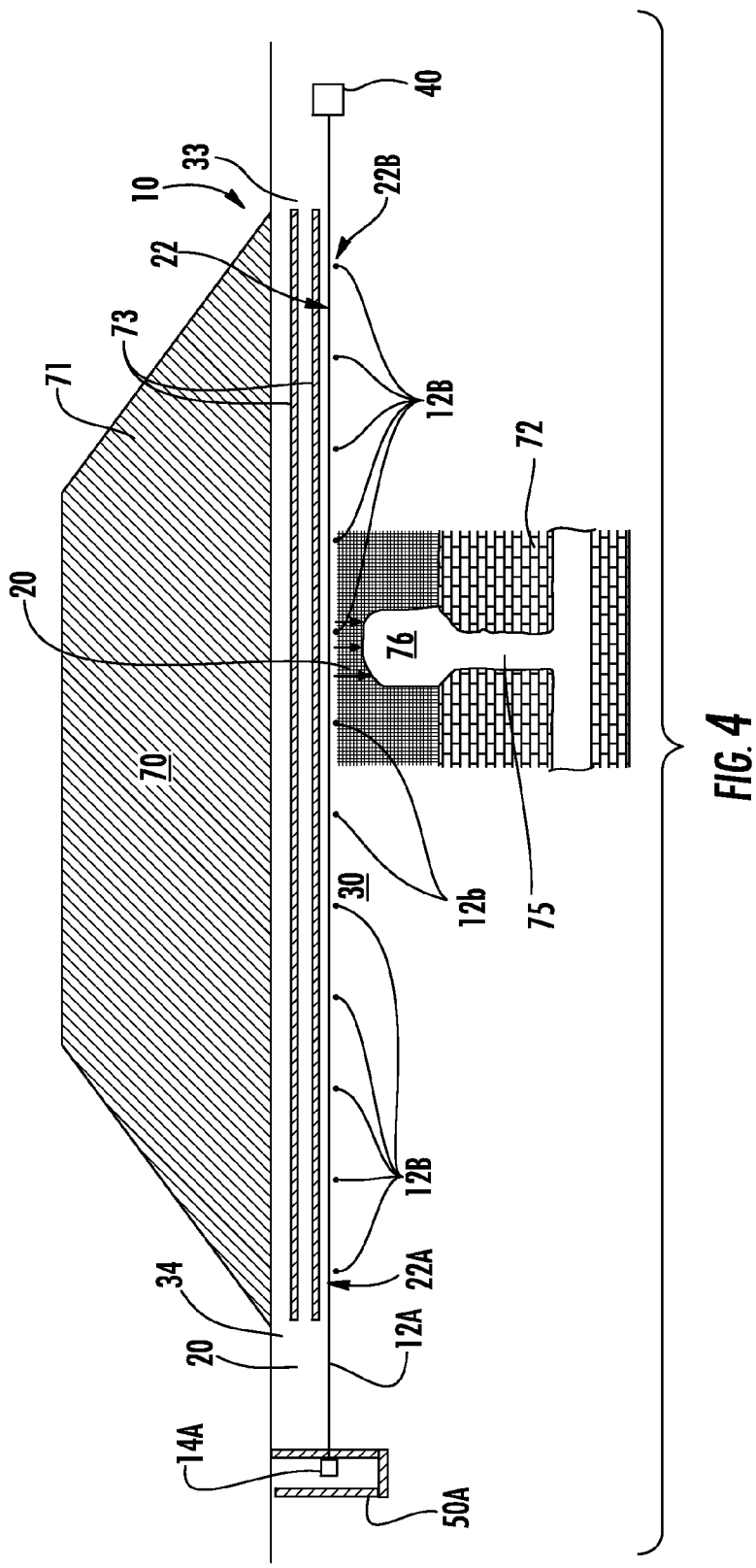
FIG. 4 is a view similar to that of FIG. 2 illustrating a pending sinkhole collapse under the tension members.

As the spall process continues, the cohesive covering sediments of overburden 20 form a structural arch. Void 76 migrates vertically upward by progressive roof collapse in FIG. 4. Before void 76 eventually breaches overburden 20, creating a sudden and dramatic sinkhole, tension members 12 directly above the pending collapse move with the first movement or displacement of the overlying overburden 20 material vertically downward in the direction of grid 22 tension members 12 in response to migration of void 76 vertically upward toward grid 22 tension members 12 in FIG. 4, inducing an increase change in the tension of the grid 22 tension members 12 above the pending collapse caused by the overlying overburden 20 pushing downwardly against the tension members 12 over the forming void 76. Concurrently, data logger 16 constantly monitors the tension of tension members 12 via sensors 14 as this occurs, and sensors 14 constantly sense tension on the various tension members 12. Sensors 14 initiate outputs to data logger 16 in response to changes in the tension of one or more tension members 12, data logger 16 receives such outputs from sensors 14, and data logger 16 initiates corresponding outputs to computer 60 in response indicating sensed changes in the tension of one or more tension members 12, alerting officials to the pending collapse.

Figure 5:
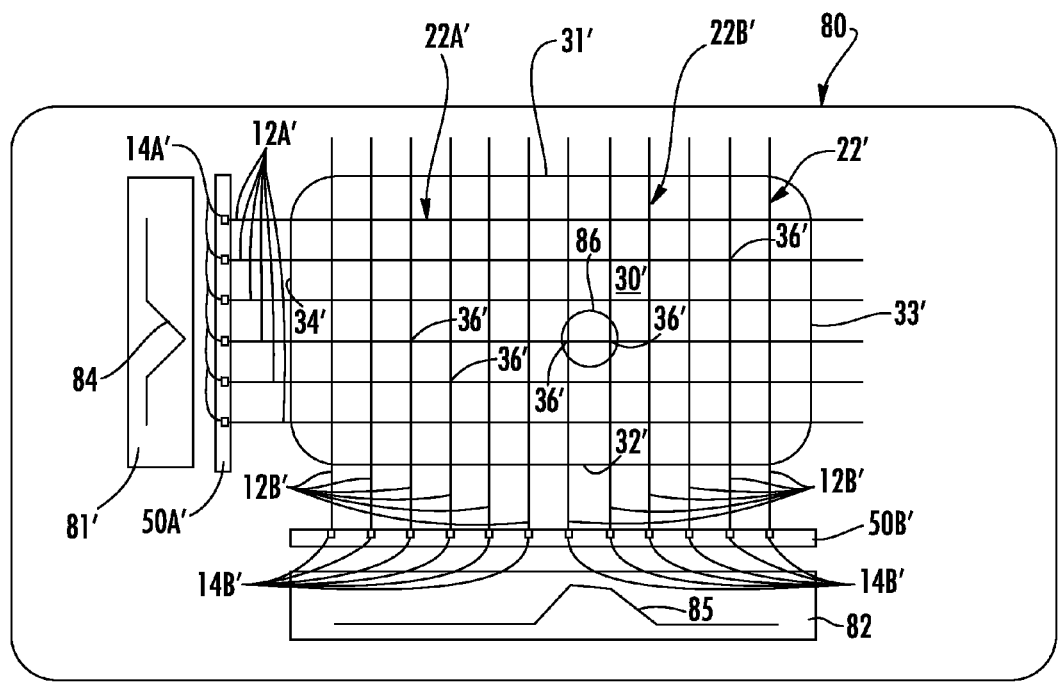
FIG. 5 is a plot of outputs from the data logger of FIG. 1 corresponding to FIG. 4.

Outputs sent to computer 60 from data logger 16 that indicate changes in the tension members 12 above the pending collapse are represented in plot 80 by peaks or spikes in graphical displays 81 and 82 in FIG. 5. One or more sensors 14A generate outputs to data logger 16 in response to changes in the X direction longitudinal tension of the one or more corresponding tension members 12A over the pending sinkhole collapse, one or more sensors 14B generate outputs to data logger 16 in response to changes in the Y direction longitudinal tension of the one or more corresponding tension members 12B over the pending sinkhole collapse, in response to the first movement of the overburden 20 material vertically downward in response to migration of void 76 vertically upward toward grid 22 tension members 12 in FIG. 4, and data logger 16 issues corresponding outputs to computer 60 in response. The outputs from data logger 16 in response to the sensor outputs indicating changes in the X direction longitudinal tension of the one or more corresponding tension members 12A over the pending sinkhole collapse are represented by one or more peaks or spikes 84 in graphical display 81. The outputs from data logger 16 in response to the sensor outputs indicating changes in the Y direction longitudinal tension of the one or more corresponding tension members 12B over the pending sinkhole collapse are represented by one or more peaks or spikes 85 in graphical display 82. Accordingly, graphical displays 81 and 82 represent the X and Y positions of the pending sinkhole collapse. From peaks 84 in graphical display 81 and peaks 85 in graphical display 82, computer 60 concurrently triangulates the location and circumference of the area of the pending sinkhole collapse using one or more of intersections 36 corresponding the tension change of one or more pairs of intersecting tension members 12A and 12B and displays the location and circumference of the pending sinkhole on ground area 30' display as circled area 86 in FIG. 5 in response. Plot 80 in FIG. 5 represents the change in X direction of the longitudinal tension of one or more tension members 12A via the one or more peaks or spikes 84 in graphical display 81, the change in the Y direction of the longitudinal tension of one or more tension members 12B via the one or more peaks or spikes 85 in graphical display 82, and the location of the pending sinkhole collapse in ground area 30' display via circled area 86. With this information in hand, operators are informed of the approximate location and size of the pending sinkhole collapse in relation to ground area 30 in FIGS. 1 and 2, and can then initiate repair efforts to prevent sinkhole collapse, and initiate area evacuations and closures if needed until the repairs are complete. Examples of repair techniques for stabilization of sinkhole collapses include compaction grouting, chemical grouting, soil cement grouting, and construction of graded filters. After the repairs have been made, system 10 can be reset for resumption of its operation.

One of the output signals issued by data logger 16 in response to the detected change in tension alerting officials to the pending collapse is an alarm or alert output. In one embodiment, computer 60 can be configured to issue one or more early-warning emails or text messages to pre-set email and or text message contacts to alert one or more authorized recipients of a pending sinkhole collapse, in response to computer 60 receiving the alert output from data logger 16. In another embodiment, data logger 16 can be wirelessly or electrically connected to issue alert outputs to activate one or more sirens or other audible alarms in the vicinity of ground area to provide an early-warning alert to those in the vicinity of ground area 30 of a pending sinkhole collapse so that the area can be evacuated as needed. Computer 60 can also be configured to activate the one or more sirens or audible alarms in response to receiving alert outputs from data logger 16 in a particular embodiment.

Figure 6:
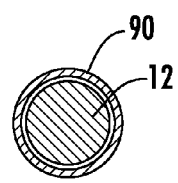
FIG. 6 is a vertical section view illustrating a tension member housed in a flexible conduit.

If desired, tension members 12 can each be housed in a protective sheath from anchor 40 to sensor 14, such as a rubber or plastic sheath. In another example, the tension members 12 can each be housed in a flexible conduit from anchor 40 to sensor 14. FIG. 6 is a vertical section view illustrating a tension member 12 as it would appear housed in such a flexible conduit 90, made of plastic or rubber for example. In this embodiment, conduit 90 and tension member 12 work together as a tension member, or tension assembly, and will concurrently move with the first movement of the overburden material vertically downward in response to the vertical migration of an underlying void in a pending sinkhole collapse, inducing an increase change in the tension of the tension member 12.

As explained above, overburden 20 incorporating system 10 can be naturally-occurring or artificially created by man. In a specific example, FIG. 7 is a fragmented vertical section view of a landfill liner 100 design, artificially created by man, incorporating system 10. The representation in FIG. 7 is highly generalized, and system 10 in FIG. 7 is represented by grid 22, including tension member 12A of first array 22A housed in a conduit 90 as disclosed in FIG. 6, and tension members 12B of array 22B each shown as they would appear housed in a conduit 90. Landfill liner 100 in FIG. 7 includes, from top to bottom, layer 101 of a protective sand aggregate, layer 102 of a geotextile filter, layer 103 of an aggregate, layer 104 of a geotextile cushion, a layer 105 of a geomembrane, a layer 106 of a compacted clay liner or substrate, and a layer 107 of a subgrade material in which grid 22 is installed. Layer 107 of subgrade material is considered overburden. Liner 100 is installed on a ground area for land to be built over layer 101 of protective sand aggregate, from deposits of material, such as solid refuse, in layers covered by soil as a matter of example. Layer 107 of subgrade material is considered overburden overlying a rock deposit. In liner 100, grid 22 works in system 10 as discussed above. Liner 100 is, of course, just one example of a potentially vast number of landfill liner designs that can incorporate a sinkhole formation detection system constructed and arranged in accordance with the principle of the invention.

Those having regard for the art will readily appreciate that an exemplary "early warning" sinkhole formation detection system 10 is disclosed, which is useful and operational for detecting initial overburden displacement in response to formation of a pending underlying sinkhole collapse, and, in response, for alerting facility operators, workers or other authority to a pending sinkhole collapse, and for pinpointing the location of the pending sinkhole collapse in the monitored ground area, all for allowing workers to initiate stabilization procedures for stabilization of sinkhole collapse and to initiate needed evacuations and facility closures. System 10 is efficient, inexpensive, and easy to install, whether into existing overburden or in a new overburden construction, including new landfill designs and landfill liners, and provides an exemplary solution to the problem of sinkhole collapse.

The invention has been described above with reference to illustrative embodiments. However, those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A sinkhole formation detection system, comprising:
   tension members associated with sensors, the tension members are arranged in a horizontal grid in an overburden, and each of the tension members is under a longitudinal tension;
   the tension members include a first array of first tension members superimposed relative to a second array of second tension members;
   the sensors each for generating outputs in response to changes in the longitudinal tension of one of the first tension members and the second tension members in response to a vertical displacement of the overburden; and
   the first tension members intersect the second tension members at intersections along a vertical plane, each intersection comprises a vertical point common in one of the first tension members and one of the second tension members.

2. The sinkhole formation detection system according to claim 1, wherein each of the tension members is longitudinally tensioned between an anchor and one of the sensors.

3. The sinkhole formation detection system according to claim 1, wherein each of the tension members is housed in a flexible conduit.

4. The sinkhole formation detection system according to claim 1, wherein each of the sensors is a strain gauge.

5. The sinkhole formation detection system according to claim 1, further comprising a data logger operatively coupled to receive the outputs from the sensors.

6. The sinkhole formation detection system according to claim 1, wherein each of the tension members is a cable.

7. A sinkhole formation detection system, comprising:
a horizontal first array of spaced-apart and parallel first tension members in an overburden;
a horizontal second array of spaced-apart and parallel second tension members in the overburden;
the first array is parallel and superimposed relative to the second array, and the first tension members are transverse relative to the second tension members;
the first tension members and the second tension members are associated with sensors;
each of the first tension members and the second tension members is under a longitudinal tension;
the sensors each for generating outputs in response to changes in the longitudinal tension of one of the first tension members and the second tension members in response to a vertical displacement of the overburden; and
the first tension members intersect the second tension members at intersections along a vertical plane, each intersection comprises a vertical point common in one of the first tension members and one of the second tension members.

8. The sinkhole formation detection system according to claim 7, wherein each of the first tension members and the second tension members is longitudinally tensioned between an anchor and one of the sensors.

9. The sinkhole formation detection system according to claim 7, wherein each of the first tension members and the second tension members is housed in a flexible conduit.

10. The sinkhole formation detection system according to claim 7, wherein each of the sensors is a strain gauge.

11. The sinkhole formation detection system according to claim 7, further comprising a data logger operatively coupled to receive the outputs from the sensors.

12. The sinkhole formation detection system according to claim 7, wherein each of the tension members is a cable.

13. A sinkhole formation detection system, comprising:
a horizontal first array of spaced-apart and parallel first tension members in an overburden across a ground area;
a horizontal second array of spaced-apart and parallel second tension members in the overburden across the ground area;
the ground area has a first side, a second side, a first end, and a second end;
the first array is parallel and superimposed relative to the second array, and the first tension members are transverse relative to the second tension members;
each of the first tension members are under a first longitudinal tension;
each of the second tension members are under a second longitudinal tension;
the first tension members are longitudinally tensioned from the first end of the ground area to the second end of the ground area between respective first anchors proximate to the first end of the ground area and respective first sensors proximate to the second end of the ground area;
the second tension members are longitudinally tensioned from the first side of the ground area to the second side of the ground area between respective second anchors proximate to the first side of the ground area and respective second sensors proximate to the second side of the ground area;
the first sensors each for generating first outputs in response to changes in the longitudinal tension of one of the first tension members in response to a vertical displacement of the overburden;
the second sensors each for generating second outputs in response to changes in the longitudinal tension of one of the second tension members in response to a vertical displacement of the overburden; and
the first tension members intersect the second tension members at intersections along a vertical plane, each intersection comprises a vertical point common in one of the first tension members and one of the second tension members.

14. The sinkhole formation detection system according to claim 13, wherein each of the first tension members is housed in a flexible conduit.

15. The sinkhole formation detection system according to claim 13, wherein each of the second tension members is housed in a flexible conduit.

16. The sinkhole formation detection system according to claim 13, wherein each of the first sensors is a strain gauge.

17. The sinkhole formation detection system according to claim 13, wherein each of the second sensors is a strain gauge.

18. The sinkhole formation detection system according to claim 13, further comprising a data logger operatively coupled to receive the first outputs from the first sensors and the second outputs from the second signals.

19. The sinkhole formation detection system according to claim 13, wherein each of the tension members is a cable.

* * * * *